United States Patent [19]

Fujiwara et al.

[11] 4,409,350

[45] Oct. 11, 1983

[54] FIRE RETARDANT ACRYLIC FIBERS CONTAINING ORGANO-TIN-SULFUR COMPOUND HAVING HIGH DEGREE OF GLOSSINESS

[75] Inventors: Kazuaki Fujiwara, Himeji; Akio Konishi, Kakogawa, both of Japan

[73] Assignee: Kanegafuchi Kagaku Kogyo Kabushiki Kaisha, Osaka, Japan

[21] Appl. No.: 317,256

[22] Filed: Nov. 2, 1981

[30] Foreign Application Priority Data

Nov. 26, 1980 [JP] Japan ............................... 55/167128

[51] Int. Cl.³ ............................................. C08K 3/00
[52] U.S. Cl. .................................. 524/180; 106/18.23; 106/18.26; 428/394
[58] Field of Search ........................ 106/18.23, 18.26; 524/180; 428/394, 920

[56] References Cited

PUBLICATIONS

Chemical Abstracts 85:7162 (1976).
Chemical Abstracts 90:40109 (1979).
Chemical Abstracts 91:58586 (1979).
Chemical Abstracts 71:103109 (1969).
Chemical Abstracts 80:84579 (1974).
Chemical Abstracts 82:59693 (1975).
Chemical Abstracts 82:87561 (1975).
Chemical Abstracts 83:29696 (1975).
Chemical Abstracts 83:61539 (1975).
Chemical Abstracts 83:165650 (1975).
Chemical Abstracts 84:45894 (1976).

*Primary Examiner*—James C. Cannon
*Attorney, Agent, or Firm*—Armstrong, Nikaido, Marmelstein & Kubovcik

[57] ABSTRACT

Acrylic fibers having high fire retardancy, glossiness and transparency comprise a copolymer containing 30 to 70% by weight of acrylonitrile and 30 to 70% by weight of at least one halogen-containing monomer, and further contain 0.2 to 3.0% by weight of at least one organic tin compound which is soluble in a solvent which can dissolve the copolymer, and 0.2 to 20% by weight of a glycidyl methacrylate polymer, based on the weight of the copolymer.

5 Claims, No Drawings

FIRE RETARDANT ACRYLIC FIBERS CONTAINING ORGANO-TIN-SULFUR COMPOUND HAVING HIGH DEGREE OF GLOSSINESS

BACKGROUND OF THE INVENTION

1. Field of the Invention

This invention relates to novel acrylic fibers having high fire retardancy, and outstanding glossiness and transparency which are not lost even if they are dyed.

2. Description of the Prior Art

Modacrylic fibers, which are prepared from a copolymer containing a relatively large proportion of a vinyl halide, have a certain degree of fire retardancy. There is, however, a sharply increasing social demand for fibers having a higher degree of fire retardancy. Various methods are known for imparting fire retardancy to fibers, for example, employing a copolymer containing a fire retardant monomer, incorporating a fire retardant additive into the spinning solution, or applying a fire retardant agent to fibers during their posttreatment. The incorporation of a fire retardant additive into the spinning solution is most popular, since it imparts semipermanent fire retardancy to fibers without impairing their physical properties substantially.

Various substances are employed as the fire retardant additive, and include, for example, a halide such as a chloride or bromide, a nitrogen or phosphorus compound, and a metal compound. Few of these substances are effective for making acrylic fibers fire retardant, and though some of them are effective, it is necessary to employ a considerably large quantity. For example, halogen compounds such as paraffin chloride, diphenyl decachloride, tetrabromobutane and tetrabromophthalic anhydride, or phosphorus compounds such as bis(dibromopropyl)phosphate, dibromopropyl phosphate, and tris(bromochloropropyl)phosphate are effective, but it is not possible to obtain satisfactory results unless at least 25% by weight of any of them is employed relative to the resin from which fibers are prepared. The use of any such large quantity of the additive is impractical, since it is not only uneconomical, but also has an adverse effect on the mechanical, thermal and optical properties of the fibers.

It is well known that a metal compound, such as diantimony trioxide, antimonic acid, magnesium oxide or hydroxide, tin oxide or stannic acid, improves the fire retardancy of a halogen-containing high molecular substance if a maximum of 10% by weight thereof is added thereto. Any such inorganic compound is, however, insoluble in a solvent used in the preparation of acrylic fibers, and deprives the fibers of their transparency. Moreover, such a compound is likely to increase in pressure, and block the spinning nozzles.

SUMMARY OF THE INVENTION

The inventors of this invention have made energetic research to find out a solution to the drawbacks of the prior art. As a result, they have discovered that it is possible to obtain acrylic fibers having high fire retardancy, and outstanding glossiness and transparency which are not lost when they are dyed, by adding to a copolymer consisting mainly of acrylonitrile and a halogen-containing monomer small quantities of an organic tin compound and glycidyl methacrylate which are soluble in a solvent which can dissolve the copolymer. They have also found that such an organic tin compound is effective in improving the fire retardancy of the fibers even if it contains a smaller quantity of tin than an inorganic tin compound, such as stannic acid or tin oxide. Although the reason for this outstanding effect is not clear, it is presumably due to the fact, for example, that the organic tin compound dissolved in the solvent for acrylic fibers are composed of very fine particles, and reacts easily with the halogen.

This invention provides acrylic fibers comprising a copolymer containing 30 to 70% by weight of acrylonitrile and 30 to 70% by weight of at least one halogen-containing monomer, and if required, further containing up to 10% by weight of at least one olefinic monomer, the copolymer further containing 0.2 to 3.0% by weight of at least one organic tin compound and 0.2 to 20% by weight of a glycidyl methacrylate polymer which are soluble in a solvent which can dissolve the copolymer. These fibers have outstanding glossiness and transparency, and improved fire retardancy.

DETAILED DESCRIPTION OF THE INVENTION

The acrylic fibers of this invention may be prepared by spinning from a copolymer containing 30 to 70% by weight of acrylonitrile, and 30 to 70% by weight of at least one halogen-containing monomer, and if required, further containing up to 10% by weight of an olefinic monomer which is copolymerizable with acrylonitrile and the halogen-containing monomer. Examples of the halogen-containing monomer include vinyl chloride, vinylidene chloride, vinyl bromide, and vinylidene bromide. If less than 30% by weight of acrylonitrile is employed, it is difficult to obtain the properties required of the fibers, while any excess over 70% by weight makes it difficult to realize high fire retardancy. According to this invention, it is preferable to employ at least 5% by weight of vinylidene chloride as the halogen-containing monomer, or one of the halogen-containing monomers. Vinylidene chloride improves the fire retardancy of the resin, and very effectively protects the fibers against loss of transparency when they are dyed.

According to this invention, the copolymer may further contain up to 10% by weight of an olefinic monomer which is copolymerizable with acrylonitrile and at least one halogen-containing monomer, as hereinabove stated. Examples of the appropriate olefinic monomer include acrylic or methacrylic acid or an ester thereof, acrylamide, methacrylamide, vinyl acetate, vinylsulfonic acid or a salt thereof, methallylsulfonic acid or a salt thereof, and styrenesulfonic acid or a salt thereof.

This invention employs as the fire retardant additive an organic tin compound which is soluble in a solvent which can dissolve a copolymer consisting mainly of acrylonitrile and at least one halogen-containing monomer. Preferably, the compound has a solubility of at least 0.5 parts in 100 parts of the solvent. Examples of the solvent include dimethylformamide, dimethylsulfoxide, dimethylacetamide, acetone, acetonitrile, $\gamma$-butyrolactone, and ethylene carbonate. It is possible to use any organic tin compound that is soluble in the solvent, for example, an organic maleate compound such as dibutyltin maleate, dibutyltin dioleylmaleate, monobutyltin trioctylmaleate or dibutyltin monolaurate maleate, an organic fatty acid compound such as dibutyltin laurate or dibutyltin stearate, a sulfur or oxygen compound such as dibutyltin sulfide, monobutyltin sulfide, dimethyltin sulfide, dioctyltin sulfide or monobutyltin oxide, and an organic mercaptide compound such as dimethyltin bis(isooctylthioglycolate), dioctyltin bis-(isooctylthioglycolate), dibutyltin bis(mercaptoethylbenzoate) or dibutyltin didodecylmercaptide. It is preferable to use an organic tin compound containing sulfur, among others. It is more effective in preventing loss of transparency, and higher in thermal discoloration resistance than any other organic tin compound, and is particularly suitable for use in the event whiteness is strongly required. It is possible to obtain fibers having high fire retardancy if 0.2 to 3.0% by weight of at least one of such organic tin compounds is employed in the resin. If less than 0.2% by weight is employed, it is impossible to expect any satisfactory improvement in the fire retardancy of the fibers, while the use of any excess over 3.0% by weight results in the fibers losing transparency when dyed in boiling water. The use of any excess is not advisable from the economical standpoint, either.

According to this invention, it is possible to employ at least one of organic zinc, phosphorus or halogen compounds in addition to the organic tin compound. For example, it is effective to add 0.01 to 1.0% by weight of an organic zinc compound and/or 0.01 to 3.0% by weight of an organic phosphorus compound and/or up to 3.0% by weight of an organic halogen compound in order to prevent the loss of transparency of the fibers. Although an organic zinc compound is itself an effective fire retardant additive, a synergistic effect can be obtained with a resultant cost reduction if organic tin and zinc compounds are employed together. Specific examples of the appropriate organic zinc compound include zinc octoate, Zn-PTBB, zinc benzoate, zinc salicylate, zinc ricinoleate, zinc isopropylxanthate, zinc ethylphenyldithiocarbamate, zinc diethyldithiocarbamate, zinc dibutylthiocarbamate, and zinc dimethylthiocarbamate. The organic zinc compound may be dissolved in any solvent other than those which are used according to this invention.

An organic phosphorus or halogen compound provides outstanding fire retardancy if used together with an organic tin compound, though it is hardly effective when used alone. Both phosphorus and halogen compounds are advantageously less expensive than tin compounds. Specific examples of the applicable organic phosphorus compound include triphenyl phosphite, triethyl phosphite, tributyl phosphite, tridecyl phosphite, diphenyl monodecyl phosphite, diphenyl mono(tridecyl) phosphite, tetraphenyl dipropylene glycol diphosphite, hexamethylphosphoric triamide, tris(2-chloroethyl) phosphate, tris(2-bromoethyl) phosphate, tris(dichloropropyl) phosphate, trischloropropyl phosphate, bis-chloropropyldichloropropyl phosphate, and bischloropropylchloroethyl phosphate. Examples of the applicable organic halogen compound include dibromodichloropropane, tetrabromobutane, tetrachlorophthalic acid, 1,2,3-tribromopropane, 1,2-dibromo-3-chloropropane, tetrabromophthalic anhydride, tetrabromoethane, tetrabromobisphenol A, paraffin chloride, pentabromomonochlorocyclohexane, tribromophenylallyl ether, tribromophenol, tribromoaniline, dibromopropanol, and CPVC.

According to a salient feature of this invention, 0.2 to 20%, or preferably 0.3 to 10%, by weight of a glycidyl methacrylate, or a copolymer consisting mainly of a glycidyl methacrylate is employed in addition to 0.2 to 3.0% by weight of an organic tin compound in order to obtain acrylic fibers having high fire retardancy, and which do not lose transparency when dyed. It is essential to employ both together in the quantities defined by this invention in order to obtain the fibers aimed at by this invention. If less than 0.2% by weight of glycidyl methacrylate is employed, it is not possible to prevent loss of transparency in the fibers when they are dyed, while any amount exceeding 20% by weight is undesirable, as it lowers the fire retardancy of the resin.

The fibers of this invention are not only excellent in resistance to loss of transparency, and fire retardancy, but also have outstanding degrees of resistance to light, thermal discoloration and rust. These fibers can be manufactured by any ordinary wet or dry method.

Description will now be made of a method of evaluating the fire retardancy of the fibers according to this invention.

The fire retardancy of fibers is usually evaluated on the fabric which is prepared therefrom. This method is, however, unsatisfactory, since combustion depends on the denseness and uniformity of the fabric, and the twist and thickness of the yarn. It is necessary to examine the fire retardancy of the fibers per se as far as possible.

Therefore, filaments were twisted to prepare test specimens in rope form, and the specimens were tested by the oxygen index method and the rope test method. The oxygen index method is a method in which the concentration of oxygen as required for continuous combustion is determined at different mixing ratios of oxygen and nitrogen. Six filaments composed of 300 fibers having a denier of 3 were twisted together 75 times per 25 inches. Two such sets of filaments were combined to prepare a test specimen in rope form. The specimen was caused to undergo contraction by 70%, and held upright in a holder on an oxygen index tester. Determination was made of the percentage of oxygen as required for combustion to continue along a specimen length of 5 cm. The greater the value obtained by the oxygen index method, the higher the fire retardancy of the fibers is. A test specimen for evaluation by the rope test method was prepared by twisting six filaments composed of 300 fibers having a denier of 3 and four sewing cotton threads (No. 30 count and 6 cord) were twisted together 75 times per 25 inches, and combining two such sets of twisted filaments and cotton threads. The cotton threads were used for preventing dropping of the burning specimen as a result of the melting by heat of acrylic fibers. Five such specimens were prepared for each of different types of fibers. The specimens were dried at 105° C. for an hour before the combustion test. A microburner flame was kept in close proximity to each vertically suspended specimen for 12 seconds. This was repeated four times. The longest afterflame was measured for each specimen, and an average afterflame of the five specimens was obtained. TABLE 1 shows the ranking of fire retardancy. Rank A-1 indicates the highest fire retardancy, while Rank B-5 indicates the lowest with complete combustion of all the specimens.

TABLE 1

| Rank | Criteria for Evaluation |
| --- | --- |
| A-1 | The five specimens showed an average afterflame not exceeding 5 seconds. None of the specimens was completely burned. |
| A-2 | Average afterflame exceeding 5 seconds, but up to and including 10 seconds. None of the specimens was completely burned. |
| A-3 | Average afterflame exceeding 10 seconds, but up to |

TABLE 1-continued

| Rank | Criteria for Evaluation |
|---|---|
| | and including 20 seconds. None of the specimens was completely burned. |
| A-4 | Average afterflame exceeding 20 seconds. None of the specimens was completely burned. |
| B-1 | One of the five specimens was completely burned. |
| B-2 | Two were completely burned. |
| B-3 | Three were completely burned. |
| B-4 | Four were completely burned. |
| B-5 | All of the five specimens were completely burned. |

It is difficult to obtain any fabric having high fire retardancy from any fibers unless they give satisfactory results when tested in accordance with both the oxygen index method and the rope test method.

The glossiness and transparency of the fibers were examined with naked eyes both before and after they were dyed, and evaluated as shown in TABLE 2 below.

TABLE 2

| | Glossiness and transparency |
|---|---|
| ⊚ | Excellent |
| ○ | Fine |
| △ | Lost considerably |
| × | Lost virtually completely. Unacceptable. |

All the dyeing tests were conducted by employing a dye solution containing 0.1% owf of Cathilon Blue K2GLH (product of Hodogaya Chemical, Japan), 1.5% owf of acetic acid, 0.5% owf of sodium acetate and 1.0% owf of Levenol wx (Kao Soap, Co, Ltd.), and having a bath ratio of 1:50. Opened fibers were placed in the dye solution, and dyed for 60 minutes, while the solution was being boiled. The fibers were dry heat treated at 145° C. for five minutes, and the reflectivity of light on the fiber surfaces was determined by a colorimeter, whereby the thermal discoloration resistance of the fibers was determined.

The invention will now be described in further detail with reference to examples which do not restrict the scope of this invention.

EXAMPLE 1 AND COMPARATIVE EXAMPLES 1 AND 2

An acrylic resin containing 56.0% by weight of acrylonitrile, 42.9% by weight of vinylidene chloride and 1.1% by weight of sodium methallylsulfonate was dissolved in dimethylformamide to form a solution having a resin concentration of 22% by weight. Added into the solution were 2.0% by weight of dibutyltin sulfide, and 3.0% by weight of glycidyl methacrylate, based on the weight of the resin, whereby a transparent spinning solution was prepared. The spinning solution was extruded into a 60% aqueous solution of dimethylformamide through a nozzle having 300 holes each having a diameter of 0.10 mm. The fibers thus obtained were washed with water, dried at 120° C., stretched by 300% under heat, and heat treated at 140° C. for five minutes.

For comparison purposes, fibers were prepared from a spinning solution containing dibutyltin sulfide, but not containing glycidyl methacrylate, and from a spinning solution not containing either dibutyltin sulfide or glycidyl methacrylate (Comparative Examples 1 and 2).

The test results are shown in TABLE 3 below.

TABLE 3

| | Example 1 (invention) | Comparative Example 1 | Comparative Example 2 |
|---|---|---|---|
| Fire retardant additive | Dibutyltin sulfide | Dibutyltin sulfide | None |
| Its quantity (%) | 2.0 | 2.0 | 0 |
| Quantity of glycidyl methacrylate (%) | 3.0 | 0 | 0 |
| Oxygen index method | 33.0 | 33.2 | 31.0 |
| Rope test method | A-4 | A-4 | B-5 |
| Fire retardancy | High | High | Medium |
| Glossiness and transparency | | | |
| Before dyeing | ⊚ | ⊚ | ⊚ |
| After dyeing | ○ | × | ○ |

As is obvious from the results shown in TABLE 3, the fibers according to EXAMPLE 1 of this invention are excellent in fire retardancy, glossiness and transparency. The fibers of COMPARATIVE EXAMPLE 1 not containing glycidyl methacrylate are not satisfactory in glossiness and transparency after dyeing, though their fire retardancy is improved. The fibers of COMPARATIVE EXAMPLE 2 not containing either the fire retardant additive or glycidyl methacrylate are not satisfactory in fire retardancy.

EXAMPLES 2 TO 5 AND COMPARATIVE EXAMPLES 3 AND 4

An acrylic copolymer resin containing 50.3% by weight of acrylonitrile, 14.8% by weight of vinylidene chloride, 33.9% by weight of vinyl bromide and 1.0% by weight of sodium methallylsulfonate was dissolved in dimethylsulfoxide to form a solution having a resin concentration of 24% by weight. Added into the solution were 1.0% by weight of a fire retardant additive, and 2.0% by weight of glycidyl methacrylate, based on the weight of the resin, whereby a transparent spinning solution was prepared. Then, the procedures of EXAMPLE 1 were repeated for preparing fibers, except that the spinning solution was extruded into a 50% aqueous solution of dimethylsulfoxide. For comparison purposes, fibers were prepared from a spinning solution not containing glycidyl methacrylate, and from a spinning solution not containing any fire retardant additive (Comparative Examples 3 and 4). The test results are shown in TABLE 4 below.

TABLE 4

| | Example 2 | Example 3 | Example 4 |
|---|---|---|---|
| Fire retardant additive | Dibutyltin bis(isooctylthioglycolate) | Monobutyltin oxide | Dibutyltin maleate |
| Quantity of glycidyl methacrylate (%) | 2 | 2 | 2 |
| Oxygen index method | 33.2 | 35.1 | 34.8 |
| Rope test method | A-1 | A-1 | A-1 |
| Fire retardancy | High | High | High |
| Glossiness and transparency | | | |
| Before dyeing | ⊚ | ⊚ | ⊚ |
| After dyeing | ○ or ⊚ | ○ | ○ |
| Thermal discoloration resistance | ○ | ○ | △ |

| | Example 5 | Comparative Example 3 | Comparative Example 4 |
|---|---|---|---|
| Fire retardant additive | Monobutyltin sulfide | Monobutyltin sulfide | None |
| Quantity of glycidyl | | | |

TABLE 4-continued

| | | | |
|---|---|---|---|
| methacrylate (%) | 2 | 0 | 2 |
| Oxygen index method | 35.0 | 35.0 | 31.8 |
| Rope test method | A-1 | A-1 | B-5 |
| Fire retardancy | High | High | Medium |
| Glossiness and transparency | | | |
| Before dyeing | ◎ | ◎ | ◎ |
| After dyeing | ○ to ◎ | x | ○ to ◎ |
| Thermal discoloration resistance | ○ | ○ | ○ to △ |

The fibers according to EXAMPLES 2 to 5 of this invention are all excellent in fire retardancy and transparency after dyeing, though those of EXAMPLE 4 containing dibutyltin maleate are somewhat inferior in thermal discoloration resistance.

EXAMPLE 6

An acrylic resin containing 45.3% by weight of acrylonitrile, 31.0% by weight of vinylidene chloride, 19.7% by weight of vinyl chloride and 4.0% by weight of acrylamide was dissolved in acetone to form a solution having a resin concentration of 23% by weight. Added into the solution were monooctyltin sulfide in the quantities shown in TABLE 5 below, and 5% by weight of glycidyl methacrylate, based on the weight of the resin, whereby a transparent spinning solution was prepared. The spinning solution was extruded into a 45% aqueous solution of acetone through a nozzle having 300 holes each having a diameter of 0.06 mm. In other respects, the procedures of EXAMPLE 1 were repeated. The test results are shown in TABLE 5.

TABLE 5

| Quantity of mono-octyltin sulfide (%) | Oxygen index method | Rope test method | Fire retard-ancy | Glossiness and transparency | |
|---|---|---|---|---|---|
| | | | | Before dyeing | After dyeing |
| 0 | 32.0 | B-4 | Medium | ◎ | ◎ |
| 0.1 | 32.1 | B-2 | " | " | " |
| 0.2 | 32.6 | A-4 | Medium to high | " | " |
| 0.5 | 33.7 | A-1 | High | " | " |
| 1.0 | 35.1 | " | " | " | ○ to ◎ |
| 2.0 | 36.0 | " | " | " | ○ |
| 3.0 | 37.2 | " | " | " | " |
| 4.0 | 37.7 | " | " | " | △ to x |

The results shown in TABLE 5 indicate that 0.1% by weight or less of the fire retardant additive is insufficient to provide satisfactory fire retardancy, while the use of 4.0% by weight or more thereof results in the fibers which decrease or lose their glossiness and transparency when dyed.

EXAMPLE 7

A plurality of copolymer resins having different compositions as shown in TABLE 6 below were employed. Each copolymer resin was dissolved in acetone to form a solution having a resin concentration of 23% by weight. Added into the solution were 1.0% by weight of dibutyltin sulfide, and 3.0% by weight of glycidyl methacrylate, based on the weight of the resin, whereby a transparent spinning solution was prepared. The procedures of EXAMPLE 6 were repeated for the extrusion of fibers from each spinning solution. The test results are shown in TABLE 6.

TABLE 6

| Copolymer resin composition (% by weight) | Oxygen index method | Rope test method | Fire retard-ancy | Glossiness and transparency | |
|---|---|---|---|---|---|
| | | | | Before dyeing | After dyeing |
| AN—VdCl$_2$—VCl—NaMAS | | | | | |
| 48.0-0-52.2-0.8 | 30.2 | A-4 | Medium to high | ◎ | ○ |
| 48.2-5.2-45.7-0.9 | 31.1 | A-2 | High | " | ○ to ◎ |
| 47.8-11.1-40.2-0.9 | 33.8 | A-1 | " | " | " |
| 48.3-51.1-0-0.7 | 36.0 | " | " | " | " |

AN: Acrylonitrile
VdCl$_2$: Vinylidene chloride
VCl: Vinyl chloride
NaMAS: Sodium methallylsulfonate As is obvious from the results shown in TABLE 6, a copolymer containing more than 5.0% by weight of vinylidene chloride provides fibers having high fire retardancy, and improved glossiness and transparency after dyeing.

EXAMPLES 8 TO 11 AND COMPARATIVE EXAMPLES 5 TO 7

An acrylic resin containing 42.0% by weight of acrylonitrile, 9.8% by weight of vinylidene chloride and 48.2% by weight of vinyl bromide was dissolved in dimethylformamide to form a solution having a resin concentration of 25% by weight. Added into the solution were monobutyltin sulfide alone or with Zn-PTBB, triphenyl phosphite or tetrabromobisphenol A in the quantities shown in TABLE 7 below, and 5% by weight of glycidyl methacrylate, based on the weight of the resin, whereby a transparent spinning solution was prepared. The procedures of EXAMPLE 1 were repeated for the extrusion of fibers from each spinning solution. The test results are shown in TABLE 7. For comparison purposes, fibers were prepared from a spinning solution containing stannic acid as the fire retardant additive, a spinning solution containing dibutyltin oxide insoluble in dimethylformamide, and a spinning solution not containing any fire retardant additive. The test results are also shown in TABLE 7.

TABLE 7

| | Example 8 | Example 9 | Example 10 | Example 11 |
|---|---|---|---|---|
| Fire retardant 1 | Mono-butyltin sulfide 1.0% | Mono-butyltin sulfide 0.5% | Mono-butyltin sulfide 0.5% | Mono-butyltin sulfide 0.5% |
| Fire retardant 2 | — | Zn—PTBB 0.5% | Triphenyl phosphite 2.0% | Tetra-bromo-bisphenol A 2.0% |
| Oxygen index method | 36.1 | 36.8 | 35.9 | 35.7 |
| Rope test method | A-1 | A-1 | A-1 | A-1 |
| Fire retardancy | High | High | High | High |

TABLE 7-continued

| Glossiness and transparency | | | | |
|---|---|---|---|---|
| Before dyeing | ◎ | ◎ | ◎ | ◎ |
| After dyeing | ○to◎ | ○to◎ | ○to◎ | ○to◎ |

|  | Comparative Example 5 | Comparative Example 6 | Comparative Example 7 |
|---|---|---|---|
| Fire retardant additive | Stannic acid 1.0% | Dibutyltin oxide 1.0% | — |
| Oxygen index method | 35.8 | 35.5 | 32.2 |
| Rope test method | A-1 | A-1 | A-3 |
| Fire retardancy | High | High | Medium |
| Glossiness and transparency | | | |
| Before dyeing | x | Δ | ◎ |
| After dyeing | x | Δ to x | ◎ |

As is obvious from the results shown in TABLE 7, the use of an organic zinc, phosphorus or halogen compound with an organic tin compound is effective in the manufacture of fibers having high fire retardancy, and retaining high glossiness and transparency after they have been dyed. The fibers of COMPARATIVE EXAMPLE 5 prepared by adding stannic acid are inferior in transparency both before and after dyeing, and of low commercial value, though they are satisfactory in fire retardancy. The fibers of COMPARATIVE EXAMPLE 6 are also unsatisfactory in transparency both before and after dyeing, since the fire retardant additive is insoluble in the solvent, though they are satisfactory in fire retardancy.

What is claimed is:

1. Acrylic fiber comprising a copolymer containing 30 to 70% by weight of acrylonitrile and 30 to 70% by weight of at least one halogen-containing monomer, said fiber further containing 0.2 to 3.0% by weight of at least one organic tin compound containing sulfur which is soluble in a solvent in which said copolymer is soluble, and 0.2 to 20% by weight of a glycidyl methacrylate polymer, based on the weight of said copolymer.

2. Acrylic fiber as set forth in claim 1, wherein said copolymer further contains up to 10% by weight of at least one olefinic monomer which is copolymerizable with said acrylonitrile and said halogen-containing monomer.

3. Acrylic fiber as set forth in claim 1 or 2, wherein said copolymer contains at least two halogen-containing monomers, one of which is vinylidene chloride occupying at least 5.0% by weight.

4. Acrylic fiber as set forth in any one of claims 1, 2 and 3, wherein said organic tin compound containing sulfur in an organo tin sulfide.

5. Acrylic fiber as set forth in claim 4, wherein said organo tin sulfide is selected from the group consisting of dibutyl tin sulfide, monobutyl tin sulfide, dimethyl tin sulfide, monooctyl tin sulfide and dioctyl tin sulfide.

* * * * *